United States Patent [19]

Wang

[11] Patent Number: 5,145,910
[45] Date of Patent: Sep. 8, 1992

[54] KETOCARBOXYLATED POLYMERS

[75] Inventor: Pen-Chung Wang, Houston, Tex.

[73] Assignee: Shell Oil Company, Houston, Tex.

[21] Appl. No.: 558,368

[22] Filed: Jul. 27, 1990

[51] Int. Cl.⁵ ............................................... C08F 8/00
[52] U.S. Cl. ....................................... 525/61; 525/386; 536/90; 536/95
[58] Field of Search .................... 525/386, 61; 536/90, 536/95

[56] References Cited

U.S. PATENT DOCUMENTS 3,634,472  1/1972  Moston .............................. 260/410.6
3,969,294  7/1976  Papouchado ................... 525/166 X

FOREIGN PATENT DOCUMENTS 2522670   9/1983  France .
54-20093  2/1979  Japan .
56-155203 12/1981 Japan .

Primary Examiner—Joseph L. Schofer
Assistant Examiner—J. M. Reddick

[57] ABSTRACT

New ketocarboxylated polymers which comprise an ester of a ketodiacid precursor, and part of all of the hydroxy or thiol groups of a polymer having one or more pendant hydroxy or thiol groups, are useful as adhesives, coatings, membranes and the like.

13 Claims, No Drawings

KETOCARBOXYLATED POLYMERS

BACKGROUND OF THE INVENTION

1. Field of the Invention

The present invention related to ketocarboxylated polymers and to their preparation.

2. Background of the Invention

It is known to react hydroxylated polymers with acids or anhydrides to prepare compositions for a variety of uses. In U.S. Pat. No. 3,634,472, monocarboxylic acids or anhydrides were reacted with hydroxy-oxetanes to produce compositions useful as lubricants. In Japanese patents 85/50,804 and 56/155,203, carboxylic acid anhydrides were reacted with hydroxylated polymers to give products having water absorbing properties. In French patent 2.522,670, polycarboxylic acid anhydrides were reacted with hydroxylated olefin polymers to produce compositions useful for moldings.

It is desirable to find new polymers having useful properties, such as better thermal stability, increased water absorption and/or decreased water-solubility of normally water-soluble polymers for use in adhesives, coatings, membrane applications and the like.

SUMMARY OF THE INVENTION

The present invention is directed to new ketocarboxylated polymers which comprise an ester of a ketodiacid precursor and part or all of the hydroxy or thiol groups of a polymer having one or more pendant hydroxy or thiol groups. Accordingly, the ketocarboxylated polymers comprise a polymer having one or more pendant hydroxy or thiol groups, which hydroxy or thiol groups have been esterified with an acid moiety derived from a ketodiacid presursor selected from a ketodiacid or a reactive derivative thereof or a spirodilactone.

The ketocarboxylated polymers of the invention include those of formula I

 (I)

wherein X is oxygen or sulfur:

is the group represented by the residue remaining after removal of the hydrogen atoms from the hydroxy or thiol groups of a hydroxylated or thiolated polymer having one or more pendant hydroxy or thiol groups; and A is the group represented by the residue remaining after removal of the hydroxy moiety from one carboxyl group of a ketodiacid precursor. Also included in the invention are the ketocarboxylated polymers obtained by crosslinking I by esterification of the second carboxyl groups of the ketodiacid precursor with hydroxylated or thiolated polymer.

The invention also includes a ketocarboxylated polymer of formula I wherein part of the residue of the ketodiacid precursor for A is replaced with the group represented by the residue remaining after removal of the hydroxy moiety from one carboxyl group of a dicarboxylic acid precursor reactant, suitably the acid or the anhydride thereof, and the ketocarboxylated polymers obtained by crosslinking by esterification of (part or all of) the second carboxyl groups of said dicarboxylic acid precursor reactant with the hydroxy or thiol groups of the polymers containing such groups.

Hydroxylated or Thiolated Polymer

Any hydroxylated or thiolated polymer having one or more pendant hydroxy or thiol groups or a presursor polymer thereof, which can form pendant hydroxy or thiol groups in situ, such as prior to or during the course of reaction with the ketodiacid or reactive derivative thereof or spirodilactone, can be used to provide the moiety

in formula I. Therefore, it is not possible to define a single, simple structural formula which will encompass all the hydroxylated or thiolated polymers for use in the invention. The hydroxylated or thiolated polymer can have terminal and/or internally pendant hydroxy or thiol groups. Internally pendant hydroxy or thiol groups are hydroxy or thiol groups which are pendant from a portion of the polymeric backbone other than the ends thereof. The number of hydroxy or thiol groups can vary but there must be at least one and preferably more than one, present in the polymer. In order to obtain a desired degree of crosslinking a certain number of hydroxyl or thiol groups must be present in the polymer and the ketodiacid precursor must be the acid or a reactive derivative thereof and not a spirodilactaone. The ketocarboxylated polymer can be lightly to substantially crosslinked. Lightly can be as low as 1% and substantially crosslinked is when at least about 80% of all the second carboxyl groups of the ketodiacid precursor are used to esterify pendant hydroxy or thiol groups, preferably, about 90% or more of said second carboxyl groups are used.

The number of hydroxyl or thiol groups will vary from polymer to polymer depending on the desired product and the kind of properties desired for the intended use thereof and accordingly a precise definition thereof is not practical. By way of illustration, when the starting polymer is a polyvinyl alcohol polymer, the number of hydroxy groups is about one per vinyl alcohol unit. In general, the number of hydroxyl or thiol groups in the polymer, calculated as —(CH$_2$CHXH)— groups, can be as low as about 1.0% by weight of the total polymer with the upper hydroxyl or thiol group content being determined solely by the composition of the polymer. The hydroxylated or thiolated polymer can be a homopolymer, copolymer, terpolymer or the like.

Hydroxylated polymers which can be used in the invention include polyvinyl acetals, such as polyvinyl formal, polyvinyl acetal, polyvinyl butyral, polyvinyl valeral having hydroxyl groups; polyvinyl esters, such as polyvinyl acetate, polyvinyl butyrate containing hydroxyl groups; polyvinyl alcohol; mixtures of polyvinyl acetal and polyvinyl esters having hydroxyl groups; terpolymers of vinyl chloride with vinyl esters having hydroxyl groups; copolymers of partially hydroxylated vinyl chloride and polyvinyl acetate; water-soluble derivatives of cellulose, such as alkyl cellulose, hydroxyalkyl cellulose and hydroxyalkyl alkyl cellulose, such as methyl cellulose. hydroxymethyl cellulose, hydroxyethyl cellulose, hydroxypropyl cellulose, hydroxyethyl methyl cellulose, hydroxypropyl methyl cellulose, hydroxybutyl methyl cellulose; cellulose esters and hydroxyalkyl cellulose esters, such as cellulose acetylphthalate (CAP), carboxyalkyl cellulose, carboxyalkyl alkyl cellulose, carboxyalkyl cellulose esters, such as carboxymethyl cellulose and their alkali metal salts; ethylene-vinyl acetate copolymers having hydroxyl groups; hydroxylated polybutadiene, hydoxylated block copolymers, such as SBS rubbers; hydroxylated KRATON ® Thermoplastic Rubber; hydroxylated polyethylene and polypropylene and copolymers thereof; and hydroxylated copolymers of vinyl acetate and acrylate esters, such as polymethyl methacrylate and polyethyl methacrylate; polyphenol polymers, such as novolac resins, such as from formaldehyde and resorcinol; polyepoxide polymers, such as linear diepoxide resins, for example EPON ® Resin 828; polyphenoxy polymers such as linear phenol-cured polymers of diepoxide resins; and starch, modified starch, dextrin and the like can also be used as the hydroxylated polymer. Of course, the thiolated counterparts of the hydroxylated polymers are also included.

For example, the polymer can be of the formula II

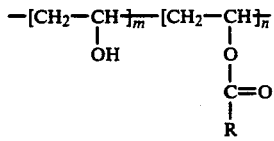

wherein R is an alkyl group of from to 10 carbon atoms, m is at least one, n is from 0 to 99 and the sum of m+n is 100.

For polymers which do not normally contain hydroxy or thiol groups, random hydroxyl or thiol groups can be introduced along the polymeric backbone in a number of ways to obtain random hydroxyl functionality. For example, carboxylated polymers are converted to hydroxy groups in a known manner such as by treating the carboxylated polymers with a base, for example, aqueous sodium hydroxide or the like.

The hydroxylated or thiolated polymers used in the invention are generally commercially available or can be prepared by conventional methods known to those of skill in the polymer art. For example, polyvinyl alcohols are synthetic resins containing various percentages of hydroxyl and acetate groups and are usually prepared by the hydrolysis of polyvinyl acetate. Other hydroxylated polymers are disclosed in French patent 2,552,670 and Japanese patents 85/50,804 and 56/155,203 and in U.S. Pat. Nos. 3,769,416, and 4,305,996, and 4,912,160, the disclosures of each of which are incorporated herein by reference.

Ketodiacid Precursors

Any spirodilactone or ketodiacid or reactive derivative thereof can be used to form the ketocarboxylated polymers of the invention. By reactive derivative of the ketodiacid is meant the corresponding diester of the acid or the dihalide of the acid, either of which derivative can be converted to the free acid group by conventional chemistry either before, during or subsequent to the ketocarboxylation of the polymer.

Suitable spirodilactones useful as ketodiacid precursors in the present invention contain from about 7 to about 30 carbon atoms and include those of the formula II

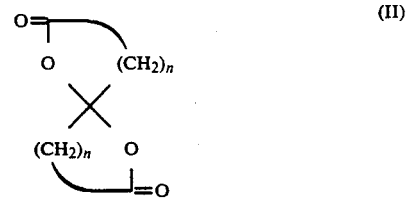

wherein n is a number from 1 to 10, preferably 2.

Suitable ketodiacids include those ketodiacids containing from about 5 to about 30 carbon atoms and containing one or more keto groups or their corresponding diester or dihalides.

The preferred precursor is a 4-oxoheptanedioic acid compound or a 1,6-dioxospiro[4.4]nonane-2.7-dione. The 4-oxoheptanedioic acid compound precursors are represented by the formula III

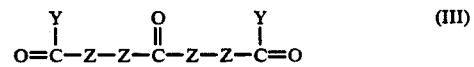

wherein Z independently is >C(Z')$_2$ in which Z' is hydrogen, lower alkyl, lower halo or aryl of up to 10 carbon atoms (e.g., phenyl), or Z is such that two adjacent Z groups together form a ring system Z" of 1 to 2 rings, each ring of from 5 to 7 ring atoms, up to two of which ring atoms are selected from nitrogen, oxygen or sulfur atoms, or mixtures thereof, with the remainder being carbon atoms, there being up to 14 carbon atoms in each Z''', two of which ring carbon atoms form a bridge between the keto and carbonyl carbon atoms connected by adjacent Z groups, and Y is hydroxy, lower alkoxy or halo, preferably middle halo.

When the Z moieties are linked together to form a ring system the ring system is aromatic, cycloaliphatic or heterocyclic and is hydrocarbyl containing only atoms of carbon and hydrogen besides any heteroatoms or substituted hydrocarbon containing additional atoms such as halogen, preferably middle halogen, in the form of inert carbon atom substituents.

In one embodiment employing the ketodiacid compound precursor, each Z moiety is >C(Z')$_2$ and the ketodiacid compound is an 4-oxoheptanedioic acid compound. In one such embodiment, largely because of a particularly convenient method of producing the precursor, a preferred 4-oxoheptanedioic acid compound has at least one hydrogen on the carbon atom adjacent to each carboxy function, that is, at least one Z' on each carbon atom adjacent to a carboxy function is hydrogen. Such 4-oxoheptanedioic acid compounds are represented by the formula IIIa

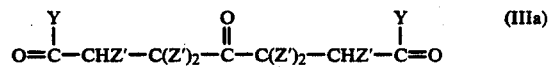

wherein Z' and Y have the previously stated meanings. Such 4-oxoheptanedioic acid compounds include 4-oxoheptanedioic acid, dimethyl 4-oxoheptanedioate, 2,6-dimethylheptanedioic acid, 2,3,5,6-tetramethyl-4-oxoheptanedioyl chloride, di-n-propyl 2,6-di-n-butyl-4-heptaneodioate, 7-carbomethoxy-3,3,5,5-tetramethyl-4-oxoheptanedioic acid and the like. The preferred ketodiacids of the above formula IIIa are those wherein each Z' is hydrogen or methyl, especially hydrogen, and each Y is hydroxy or methoxy, especially hydroxy.

These ketodiacid compounds are known compounds or are produced by known methods, but the esters of formula IIIa, i.e., the compounds wherein Y is alkoxy, are produced by reaction of formaldehyde with an α,β-ethylenically unsaturated carboxylic acid ester such as methyl acrylate, ethyl methacrylate, methyl crotonate, methyl ethacrylate, propyl 2,3-dimethylbutanoate and the like. This reaction is conducted in the presence of a catalyst system which comprises a thiazolium salt and a tertiary amine and produces the dialkyl 4-oxoheptane-dioate derivative in good yield. This process is described in greater detail in copending U.S. Pat. No. 4,800,231, incorporated herein by reference. Conversion of the esters thereby obtained to free acids or acid halides is by conventional methods as is the general interconversion of the acids, esters or acid halides of formula IIIa.

In a second embodiment of the ketodiacid compound precursor, the 4-ketodiacid incorporates cyclic moieties between the keto group and the carboxy functions. i.e., two adjacent Z moieties form a fused cyclic ring structure Z" of 1 to 2 rings, each ring of from 5 to 7 ring atoms, up to 2 of which ring atoms are selected from nitrogen, oxygen, or sulfur atoms or mixtures thereof, with the remainder being carbon atoms, there being up to 14 carbon atoms in each Z", two of which ring carbon atoms form a bridge between the (keto and carbonyl) atoms connected by adjacent Z groups. Such diacid compounds are presented by the formula IIIb

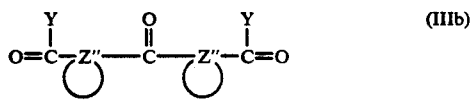

(IIIb)

wherein Y and Z" have the previously stated meanings. Illustrative of these cyclic ketodiacid compounds are di(2-carboxycyclohexyl) ketone, di(2-carboxyphenyl) ketone, di(2-carbopropoxycyclo-4-pentenyl) ketone, di(2-chlorocarbonylphenyl) ketone, di(2-carboxypyridyl) ketone, 2-carboxyphenyl N-methyl-3-carboxy-2-pyrryl ketone, di(3-carbethoxy-2-morpholyl) ketone, di(3-carbomethoxy-2-napthyl) ketone and the like. The preferred cyclic ketodiacid compounds of formula IIIb are those wherein each Z" is a ring system of from 5 to 6 carbon atoms, inclusive, and up to one nitrogen atom, such as pyrido and particularly benzo.

Such ketodiacids are known compounds or are produced by known methods, such as the method of U.S. Pat. No. 1,999,181 or the method of Cava et al, *J. Am. Chem. Soc.*, 20, 6022 (1955).

In yet another embodiment of the ketodiacid compound precursor, the ketodiacid incorporates one fused cyclic moiety with the remainder of the Z moieties being >C(Z')$_2$, i.e., the compounds are of the formula IIIc

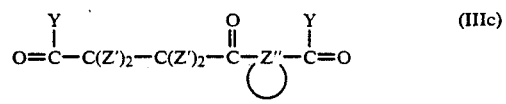

(IIIc)

wherein Y, Z' and Z" have the previously stated meanings. Such ketodiacids of one cyclic moiety are illustrated by 3-(2-carboxybenzoyl)propionic acid, 3-(2-carbomethoxy-2-pyridyloyl)-2-ethyl-propionic acid, ethyl 3-(2-carbethoxybenzoyl)propionate, 3-(2-carboxy-4-methylbenzoylbutyrl) chloride and the like. The ketodiacids of the above formula IIIc are known compounds or are produced by known methods. For example, 2-carboxymethylbenzaldehyde reacts with methyl acrylate according to the general teachings of U.S. Pat. No. 4,800,231, to produce methyl 3-(2-carbomethoxybenzoyl)propionate.

In another embodiment of the invention, the ketodiacid precursor is a 1,6-dioxaspiro[4.4]nonane-2,7-dione compound wherein the spiro ring system is substituted with hydrogen, alkyl or halogen, or which incorporates fused cyclic substituents which include the 3-and 4-spiro ring positions and/or the 8- and 9-spiro ring positions of the spiro ring system.

The precursor, in terms of the terms of the polymers of formula I, is represented by the formula IV

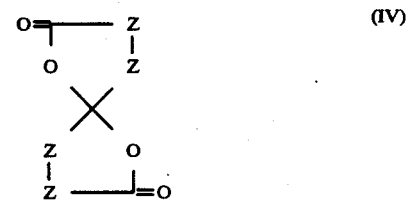

(IV)

wherein Z has the previously stated meaning. In the embodiment of these precursors of the above formula IV wherein each Z is >C(Z')$_2$, the spirodilactone is represented by the formula IVa

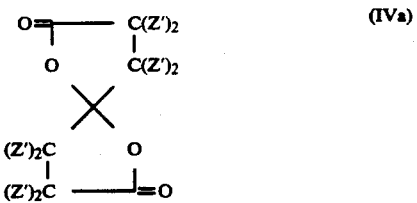

(IVa)

wherein Z' has the previously stated meaning. Illustrative of such spiro-dilactones are 1,6-dioxaspiro[4.4]nonane-2,7-dione, 3.8-dimethyl-1,6-dioxaspiro[4.4]nonane-2,7-dione, 3,4,8,9-tetramethyl-1,6-dioxaspiro[4.4]-nonane-2,7-dione, 4,9-diphenyl-1,6-diazaspiro[4.4]nonane-2,7-dione, 3,3,8,8-tetramethyl-1,6-dioxaspiro[4.4-]nonane-2,7-dione, 3,3,4,4,8,8,9,9,-octamethyl-1,6-dioxaspiro[4.4]nonane-2,7-dione, 3,4,8,9-tetrafluoro-1,6-dioxaspiro[4.4]nonane-2,7-dione and the like. The preferred spirodilactones of the above formula IVa are those wherein at least one Z' of each Z'-substituted carbon atom is hydrogen.

The compounds of formula IVa are known compounds or are produced by known methods such as the process of Pariza et al, *Synthetic Communications.* Vol.

13(3), pp. 243-254 (1983), herein incorporated by reference.

In the embodiment of the precursors of the above formula IV which incorporates a fused cyclic moiety as a part of the two rings of the spiro ring system, the spirodilactones are represented by the formula IVb

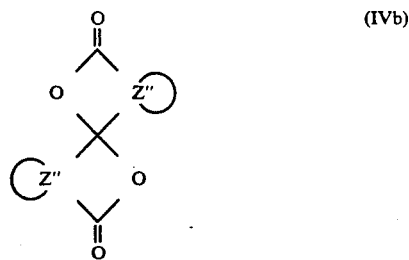

wherein Z" has the previously stated meaning. Typical compounds of this formula IVb are 3,4,8,9-dibenzo-1,6-dioxaspiro[4.4]nonane-2-7-dione, 3,4,8,9-di(cyclopentano)-1,6-dioxaspiro[4.4]nonane-2,7-dione, 3,4,8,9-di(4-methylbenzo)-1,6-dioxaspiro[4.4]nonane-2,7-dione, 3,4,8-9-di-(pyrido)-1,6-dio xaspiro[4.4]noname-2,7-dione and the like. These compounds are known compounds or are produced by known methods, for example, the process of the above Cava et al article or by the process of U.S. Pat. No. 1,999,181.

In a third embodiment of the spirodilactone spirodilactam precursor, a cyclic moiety is fused to one spiro ring and the other spiro ring is free from fused ring substituents. Such spirodilactones are represented by the formula IVc

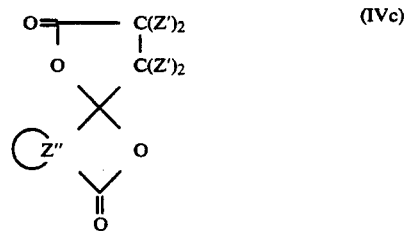

wherein Z' and Z" have the previously stated meanings. Such spirodilactones are illustrated by 3-methyl-8.9-benzo-1.6-dioxaspiro[4.4]-nonane-2,7-dione, 3,4-benzo-1,6-dioxaspiro[4.4]nonane-2,7-dione, and 3,3,4,4-tetramethyl-8,9-morphoyl-1,6-diazaspiro[4.4]nonane-2,7-dione and the like. The spirodilactones of the above formula IVc are produced by known methods, for example, the dehydration of the corresponding ketodiacid. By way of illustration, 3,4-benzo-1,6-dioxaspiro-[4.4]nonane-2,7-dione, is produced by dehydration of 3-(2-carboxy-benzoyl)propionic acid through application of heat.

In general, the preferred precursors are hydrocarbon except for the oxygen atoms of the lactone moieties, and particularly preferred are those spirodilactones which are free from fused ring substituents (formula IVa) or those which have a fused ring substituent on each of the spiro rings (formula IVb). An especially preferred spirodilactone spirodilactam precursor of the first class is 1,6-dioxaspiro[4.4]nonane-2,7-dione The acyclic 4-oxoheptanedioic acid compounds are known or are produced by the methods described above, but certain of the esters are also produced by the reaction of formaldehyde and unsaturated carboxylic acid esters by the process disclosed and claimed in U.S. Pat. No. 4,800,231. Interconversion of the acids, esters or acid halides of formula III is by conventional methods. The production of 4-oxoheptanedioic acid compounds of formula IV which contain cyclic moieties is by the process of Cava et al, *J. Am. Chem. Soc.*, 77. 6022 (1955). The spirodilactones of formula IV are produced by the process of Pariza et al, *Synthetic Communications*, Vol. 13(3), pp. 243-254 (1983), or by the process of U.S. Pat No. 1,999,181.

Dicarboxylic Acid Precursor

Any dicarboxylic acid or reactive derivative thereof which can form esters with the pendant hydroxy or thiol groups of the polymer can be used as the optional dicarboxylic acid precursor reactant to replace part of the ketodiacid precursor. This includes the free diacid, the diesters of the acid, the dihalides or preferably the anhydride.

Suitable dicarboxylic acid precursors include dicarboxylic acids having at least about 3 to about 24 carbon atoms and include' for example, lower aliphatic dicarboxylic acids, such as malonic acid, succinic acid, maleic acid, glutaric acid, adipic acid, suberic acid. sebacic acid as well as higher aliphatic dicarboxylic acids containing between about 11 and about 22 carbon atoms, such as undecanedioic and dodecanedioic acids as well as tri-, tetra-, penta-, hexa-, hepta-, octa-decanedioic acids and similar higher aliphatic dicarboxylic acids. Also useful are aromatic dicarboxylic acids, such as phthalic acid, isophthalic acid, terphthalic acid, tetrahydrophthalic acid and similar aromatic dicarboxylic acids. Preferably, the dicarboxylic acid precursor is an aromatic acid anhydride, especially phthalic anhydride.

The ketocarboxylated polymers of the invention comprise from about 1% to about 50% equivalent of said dicarboxylic acid based on the total hydroxy groups in the polymer reactant, preferably from about 5% to about 30%.

Preparation

A process for preparing a ketocarboxylated polymer of the invention comprises treating a hydroxylated or thiolated polymer having one or more pendant hydroxy or thiol groups or a presursor polymer thereof in the liquid phase under acidic conditions with a ketodiacid precursor. The desired ketocarboxylated polymer can be isolated from the reaction mixture by conventional methods, such as filtering the mixture, washing with water, and removing any solvent or excess reactants by distillation, preferably under reduced pressure.

The reaction is conducted under acidic conditions, which is most readily accomplished by the use of an acid as a reaction diluent, which can also aid in maintaining the liquid phase reaction conditions. For example, the acidic compound can be acetic acid or the like.

While the reaction can proceed without the aid of a catalyst, it is optionally conducted in the presence of one or more catalytic compounds. When the ketodiacid precursor is a spirodilactone, the catalyst is a basic compound, which will not interfere with the reaction. Suitable basic compounds are selected from alkali and alkaline earth metal salts, alkoxides, onium compounds, for example, ammonium or phosphonium salts, and the like. For example, the catalyst can be sodium acetate or the like. Such materials are present in a catalytically effective amount which is an equivalent amount or less than the amount of spirodilactone.

When the ketodiacid precursor is a ketodiacid or reactive derivative thereof, the catalyst is any material that is suitable as an esterification or transesterification catalyst, including strong acids, such as sulfuric, benzenesulfonic, hydrochloric acid or the like, tin salts, organo-titanium compounds, silica gel, cation-exchange resins and the like.

When the ketodiacid precursor is the acid halide, the reaction mixture should contain a halide acceptor, which is usually an amine of the type conventionally known in the art for the purpose of accepting halide ions formed during a reaction, for example, pyridne or the like. Part of up to essentially all of the hydroxy or thiol groups can be esterified with part or all of one or both carboxyl groups of the ketodiacid precursor (optionally replaced in part by dicarboxylic acid precursor). It is preferred that the reaction be conducted until the desired, usually substantially complete, mono- or diesterification (crosslinking) of the hydroxylated or thiolated polymer has been obtained. The degree of mono- or diesterification can be as low as about 1% of the hydroxy or thiol groups with the upper limit being as high as about 80% or preferably about 90% to about 100% of the hydroxy or thiol groups in the polymer.

The amount of ketodiacid precursor used depends on the degree of esterification desired. If monoesterification is desired in which the product is a half ester containing an ester group and a carboxylic acid group, then at least an equivalent amount of ketodiacid or spirodilactone to hydroxy or thiol groups is used, and preferably an excess of up to 20% by weight over the stoichiometric proportions required in order to ensure substantially complete monoesterification. If diesterification (crosslinking) is desired by at least some degree of esterification with both carboxyl groups, the reactant must be a ketodiacid or reactive derivative thereof and not a spirodilactone, and the proportions of the acid or reactive derivative can be adjusted as can be determined by those of skill in the art to give the desired amount of crosslinking.

The reaction is usually conducted at normal pressures, although lower and higher pressures can be used. The reaction temperature can vary but good reactions are obtained when the reaction is conducted at elevated temperatures of from about 50 to about 150 degrees C., preferably from about 60 to about 100 degrees C.

The reaction is usually conducted by forming a mixture of the hydroxylated or thiolated polymer, the ketodiacid precursor and optionally one or more dicarboxylic acid reactants, preferably the dicarboxylic acid anhydride, and optionally one or more catalytic materials and/or diluents or the like and heating the resulting mixture while agitating, e.g., stirring, until the desired esterification takes place and recovering the ketocarboxylated polymer product.

The ketocarboxylated polymers of the invention have a molecular weight in the range of from about 1,000 to about 500,000, preferably from about 10,000 to about 100,000.

Use

The ketocarboxylated polymers of the invention have a variety of uses depending on the kind of polymer backbone, the molecular weight and the degree of hydroxylation or mercaptation in the polymer reactant, the degree of subsequent ketocarboxylation in the final product and the degree, if any, of the crosslinking in the final product. Depending on the polymer, the products can be very hydrophillic and can be used wherever such properties are desired in polymeric materials, such as household or personal care products.

The ketocarboxylated polymers can be used in adhesives, as coating, as membranes, as molding materials and the like. For example, when the polymer backbone is polyvinyl alcohol, the ketocarboxylated polymer of the invention can absorb many times its own weight of water and such property can be used in oil recovery fluids, in inks, in the medical field, e.g., as a material for contact lens membranes, in the food industry, in agriculture or the like. Other uses include: as a sizing for paper, in fabric treating and the like.

ILLUSTRATIVE EMBODIMENTS

The following embodiments are provided to illustrate the invention and should not be regarded as limiting it in any way. Nuclear Magnetic Resonance Spectra analyses were used to confirm the structure of the products.

EMBODIMENT 1

Polyvinyl Alcohol 4-Ketopimelate

A mixture of 44 g of polyvinyl alcohol and 10 g of 1,6-dioxa-spiro[4.4]nonane-2,7-dione, 200 ml of acetic acid and 20 g of sodium acetate was stirred for 3 hours at 85 degrees C. After cooling the resulting mixture, water was added to wash the product and a quantitative yield of the desired product was obtained having the formula

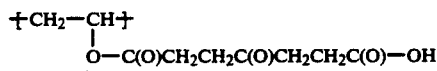

EMBODIMENT 2

Polyvinyl Alcohol 4-Ketopimelate Phthalate

A mixture of 44 g of polyvinyl alcohol and 10 g of 1,6-dioxa-spiro[4.4]nonane-2,7-dione, 10 g of phthalic anhydride' 300 ml of acetic acid and 20 g of sodium acetate was stirred for 3 hours at 85 degrees C. After cooling the resulting mixture, water was added to wash the product and a quantitative yield g of the desired product was obtained having the formula

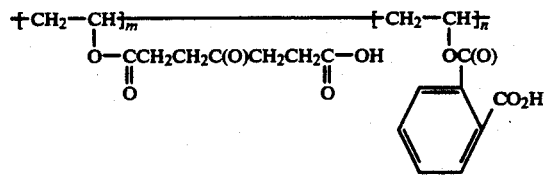

EMBODIMENT 3

Hydroxypropyl Cellulose 4-Ketopimelate

A mixture of 40 g of hydroxypropyl cellulose and 40 g of 1,6-dioxaspiro[4.4]nonane-2,7-dione, 300 ml of acetic acid and 20 g of sodium acetate was stirred for 3 hours at 85 degrees C. After cooling the resulting mixture, water was added to wash the product and a quantitative yield of the desired product was obtained.

EMBODIMENT 4

Hydroxypropyl Cellulose 4-Ketopimelate Phthlate

A mixture of 20 g of hydroxypropyl cellulose and 10 g of 1,6-dioxaspiro[4.4]nonane-2,7-dione. 10 g of phthalic anhydride' 150 ml of acetic acid and 10 g of sodium acetate was stirred for 3 hours at 85 degrees C. After cooling the resulting mixture, water was added to wash the product and a quantitative yield of the desired product was obtained.

EMBODIMENT 5

Cellulose Acetate 4-Ketopimelate

A mixture of 10 g of cellulose acetate and 10 g of 1,6-dioxaspiro[4.4]nonane-2,7-dione, 75 ml of acetic acid and 5 g of sodium acetate was stirred for 3 hours at 85 degrees C. After cooling the resulting mixture, water was added to wash the product and quantitative yield of the desired product was obtained.

What is claimed is:

1. A ketodiacid ester of the hydroxy or thiol groups of a polymer having one or more pendant hydroxy or thiol groups.

2. A ketocarboxylated polymer comprises a polymer, having one or more pendant hydroxy or thiol groups, which hydroxy or thiol groups have been esterified with a ketodiacid precursor.

3. A ketocarboxylated polymer of the formula I

I wherein X is oxygen or sulfur;

is the group represented by the residue remaining after removal of the hydrogen atoms from the pendant hydroxy or thiol groups of a hydroxylated or thiolated polymer having one or more pendant hydroxy or thiol groups; and A is the group represented by the residue remaining after removal of the hydroxy moiety from one carboxyl group of a ketodiacid.

4. A ketocarboxylated polymer according to claim 3 wherein A is the group

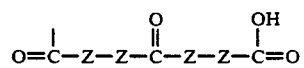

where Z independently is $>C(Z')_2$ in which $Z'$ is hydrogen, lower alkyl, lower halo or aryl of up to 10 carbon atoms or Z is such that two adjacent Z groups together form a ring system $Z''$ of 1 to 2 rings, each ring containing from 5 to 7 carbon atoms, up to two of which ring atoms are selected from nitrogen, oxygen or sulfur atoms or mixtures thereof, with the remainder being carbon atoms, there being up to 14 carbon atoms in each $Z''$, two of which ring carbon atoms form a bridge between the keto and carbonyl carbon atoms connected by adjacent Z groups.

5. A ketocarboxylated polymer according to claim 4 wherein the polymer residue,

is the group remaining after removal of the hydrogen atoms from the hydroxy groups of a hydroxylated polymer in which X is oxygen.

6. A ketocarboxylated polymer according to claim 5 wherein the hydroxylated polymer is polyvinyl alcohol.

7. A ketocarboxylated polymer according to claim 5 wherein the hydroxylated polymer is cellulose acetate.

8. A ketocarboxylated polymer according to claim 5 wherein the hydroxylated polymer is hydroxypropyl cellulose.

9. A ketocarboxylated polymer according to claim 5 wherein A is the residue from a spirodilactone.

10. A ketocarboxylated polymer according to claim 9 wherein A is the residue of 1,6-dioxospiro[4.4]nonane-2,7-dione.

11. A ketocarboxylated polymer according to claim 5 wherein part of the group A is replaced by the group represented by the residue remaining after removal of at least one hydroxy group from a dicarboxylic acid.

12. A ketocarboxylated polymer according to claim 11 wherein the dicarboxylic acid is phthalic acid.

13. A ketocarboxylated polymer according to claim 5 wherein part of the residue of the ketodiacid for A is replaced by the group represented by the residue remaining after removal of at least one hydroxy group from a dicarboxylic acid.

* * * * *